(12) United States Patent
Fujii et al.

(10) Patent No.: US 9,398,400 B2
(45) Date of Patent: Jul. 19, 2016

(54) COMMUNICATION DEVICE, PROGRAM, AND COMMUNICATION ESTABLISHMENT METHOD

(71) Applicant: DENSO CORPORATION, Kariya, Aichi-pref. (JP)

(72) Inventors: Masahiro Fujii, Obu (JP); Koichi Masuda, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/390,348

(22) PCT Filed: Apr. 1, 2013

(86) PCT No.: PCT/JP2013/002233
§ 371 (c)(1),
(2) Date: Oct. 2, 2014

(87) PCT Pub. No.: WO2013/150765
PCT Pub. Date: Oct. 10, 2013

(65) Prior Publication Data
US 2015/0189462 A1 Jul. 2, 2015

(30) Foreign Application Priority Data
Apr. 4, 2012 (JP) .................. 2012-085677

(51) Int. Cl.
*H04W 76/02* (2009.01)
*H04W 4/00* (2009.01)
(Continued)

(52) U.S. Cl.
CPC .............. *H04W 4/008* (2013.01); *H04W 4/005* (2013.01); *H04W 4/046* (2013.01); *H04W 4/18* (2013.01); *H04W 76/02* (2013.01); *H04W 76/023* (2013.01)

(58) Field of Classification Search
CPC ... H04W 4/008; H04W 76/02; H04W 76/023; H04B 7/18539
See application file for complete search history.

(56) References Cited

U.S. PATENT DOCUMENTS

| | | | |
|---|---|---|---|
| 2008/0194264 A1* | 8/2008 | Eckert | H04W 68/02 455/445 |
| 2010/0138149 A1 | 6/2010 | Ohta et al. | |

(Continued)

FOREIGN PATENT DOCUMENTS

| | | |
|---|---|---|
| JP | 2003102063 A | 4/2003 |
| JP | 2009080733 A | 4/2009 |

(Continued)

OTHER PUBLICATIONS

International Search Report and Written Opinion (in Japanese with English Translation) for PCT/JP2013/002233, mailed May 7, 2013; ISA/JP.

*Primary Examiner* — Andrew Wendell
(74) *Attorney, Agent, or Firm* — Harness, Dickey & Pierce, P.L.C.

(57) ABSTRACT

Provided is a communication device which, during communication with a first communication device, can further receive separate service offerings by communicating with second communication devices. Even if a wireless connection with the first communication device has been established, when not communicating prescribed content with the first communication device, this communication device gives priority to establishing a wireless connection with a second communication device which has newly entered into the communication range. On the other hand, when communicating prescribed content with the first communication device, the communication device does not immediately establish a wireless connection with a second communication device.

10 Claims, 5 Drawing Sheets

(51) Int. Cl.
*H04W 4/04* (2009.01)
*H04W 4/18* (2009.01)

(56) References Cited

U.S. PATENT DOCUMENTS

| | | | | |
|---|---|---|---|---|
| 2010/0323758 A1* | 12/2010 | Amano | ............... | G06F 3/1292 455/557 |
| 2011/0014928 A1* | 1/2011 | Ruckart | ............... | G06Q 30/02 455/456.3 |
| 2011/0151788 A1* | 6/2011 | Castrogiovanni | ... | H04W 76/043 455/41.2 |
| 2012/0110078 A1* | 5/2012 | Yeo | ............... | G06F 21/52 709/204 |
| 2013/0073623 A1* | 3/2013 | Nguyen | ............ | H04N 21/23103 709/204 |
| 2014/0256298 A1* | 9/2014 | Moss | ............... | H04W 4/12 455/414.1 |

FOREIGN PATENT DOCUMENTS

| | | |
|---|---|---|
| JP | 2009260540 A | 11/2009 |
| JP | 2010130669 A | 6/2010 |
| JP | 2010130674 A | 6/2010 |
| JP | 2011066777 A | 3/2011 |

\* cited by examiner

COMMUNICATION DEVICE, PROGRAM, AND COMMUNICATION ESTABLISHMENT METHOD

CROSS REFERENCE TO RELATED APPLICATIONS

This application is a U.S. National Phase Application under 35 U.S.C. 371 of International Application No. PCT/JP2013/002233 filed on Apr. 1, 2013 and published in Japanese as WO 2013/150765 A1 on Oct. 10, 2013. The present application is based on and claims the benefit of priority from Japanese Patent Application No. 2012-085677 filed on Apr. 4, 2012. The entire disclosures of all of the above applications are incorporated herein by reference.

FIELD OF THE INVENTION

The present disclosure relates to a communication device wirelessly communicable with a different communication device, a program for the communication device, and a communication establishment method.

BACKGROUND ART

Some of current in-vehicle apparatuses (e.g., a navigation apparatus, an audio apparatus etc.) have a function of remotely controlling a communication device of a user such as a portable information terminal or the like through communicating with the communication device.

In particular, in recent years, there is a proposed technology to detect entry of a communication device into a communication area of an in-vehicle apparatus and automatically perform wireless connection in order to remotely control this communication device.

RELATED ART DOCUMENT

Patent Document

Patent Document 1: JP 2010-130669A (corresponding to US 20100138149A).

SUMMARY OF INVENTION

However, according to studies on in the above-described technology by the inventor of the present application, because of its specifications, a communication function of the in-vehicle apparatus is typically exclusively occupied by a particular communication device. Thus, under this situation, when a different communication device enters into the communication area, communication with this different communication device cannot be performed. As a result, it may become impossible to provide other services such as receiving information through communication with this another communication device.

The present disclosure of the present application is made in view of the foregoing, and has an object to provide a communication device, a program and a communication establishment method that, during communication with a certain communication device, makes it possible to provide services through communicating with a different communication device.

A subject communication device according to a first example of the present disclosure is communicable with different communication devices. The subject communication device comprises: a connection establishment section establishing a wireless connection with the different communication devices; an entry detection section detecting that the different communication devices enter into a communication area; and a communication determination section determining whether the wireless connection with a first communication device, which is one of the different communication devices, has not been established at a time when the entry detection section detects that a second communication device, which is another one of the different communication devices, enters into the communication area, or whether or not a communication of a predetermined content is being performed with the first communication device having the established wireless communication at the time when the entry detection section detects that the second communication device enters into the communication area.

The connection establishment section is configured to preferentially establish the wireless connection with the detected second communication device when the communication determination section determines that, at the time when the entry detection section detects that the second communication device enters into the communication area, the wireless connection with the first communication device has not been established or the communication of the predetermined content is not being performed with the first communication device.

According the subject communication device configured in the above way, even when the wireless connection with a certain communication device (first communication device) is established, the wireless connection with a different communication device (second communication device) newly entering into the communication is preferentially established when the communication of the predetermined contents is not being performed with this first communication device.

Specifically, when the communication of the predetermined content is being performed with the first communication device, the wireless connection with the second communication device is not immediately established. Thus, for example, when a communication concerning a control/operation in the first communication device is defined as "the communication of the predetermined content", a different service becomes enjoyable through establishment of the wireless connection with the second communication device under a condition that the control/operation in the first communication device is not hindered.

The "preferentially establishing the wireless connection" in this configuration refers to establishing the wireless connection by giving priority to establishing the wireless connection with second communication device. When a communication function of the subject communication device is designed to be exclusively occupied by a particular communication device, the wireless connection with the earlier-connected first communication device is released and then the wireless connection with the second communication device is established.

In this regard, however, when there is a different communication path enabling communication with the first communication device, the wireless connection with the earlier-connected first communication device is released and the first communication device is communicably connected via the different communication path and then the wireless connection with the second communication device is established.

A program according to an example of the present disclosure causes a computer to function as the above subject communication device. The computer provided with this program can constitute part of the above subject communication device.

A computer system executing this program can provide the same operations and technical effects as any of the above configuration.

The above mentioned program includes a series of instructions adapted for processing of a computer system and is provided to a communication device or its user via various storage medium (e.g., non-transitory tangle storage medium) or a communication line.

A communication establishment method according to an example of the present disclosure is for a subject communication device to communicate with different communication devices. The communication establishment method comprises: in a connection establishment process, establishing a wireless connection with the different communication devices; in a device detection process, detecting that the different communication devices enter into a communication area; and in a communication determination process, determining whether or not the wireless connection with a first communication device, which is one of the different communication devices, has not been established at a time when it is detected in the device detection process that a second communication device, which is another one of the different communication devices, enters into the communication area, or whether or not a communication of a predetermined content is being performed with the first communication device establishing the established wireless communication at the time when it is detected in the device detection process that the second communication device enters into the communication area.

The wireless connection with the detected second communication device is preferentially established in the connection establishment process when it is determined in the communication determination process that the wireless connection with the first communication device has not been established or the communication of the predetermined content is not being performed with the first communication device at the time when it is detected in the device detection process that the second communication device enters into the communication area.

This communication establishment method can provide the same operations and technical effects as the above subject communication device.

BRIEF DESCRIPTION OF THE DRAWINGS

The above and other purpose, feature, and advantage of the present disclosure will become more apparent from the below detailed description made with reference to the accompanying drawings. In the drawings.

DESCRIPTION OF EMBODIMENTS

In the following, embodiments of the present disclosure will be described with the drawings.

1. Outline Configuration

Figure 1:
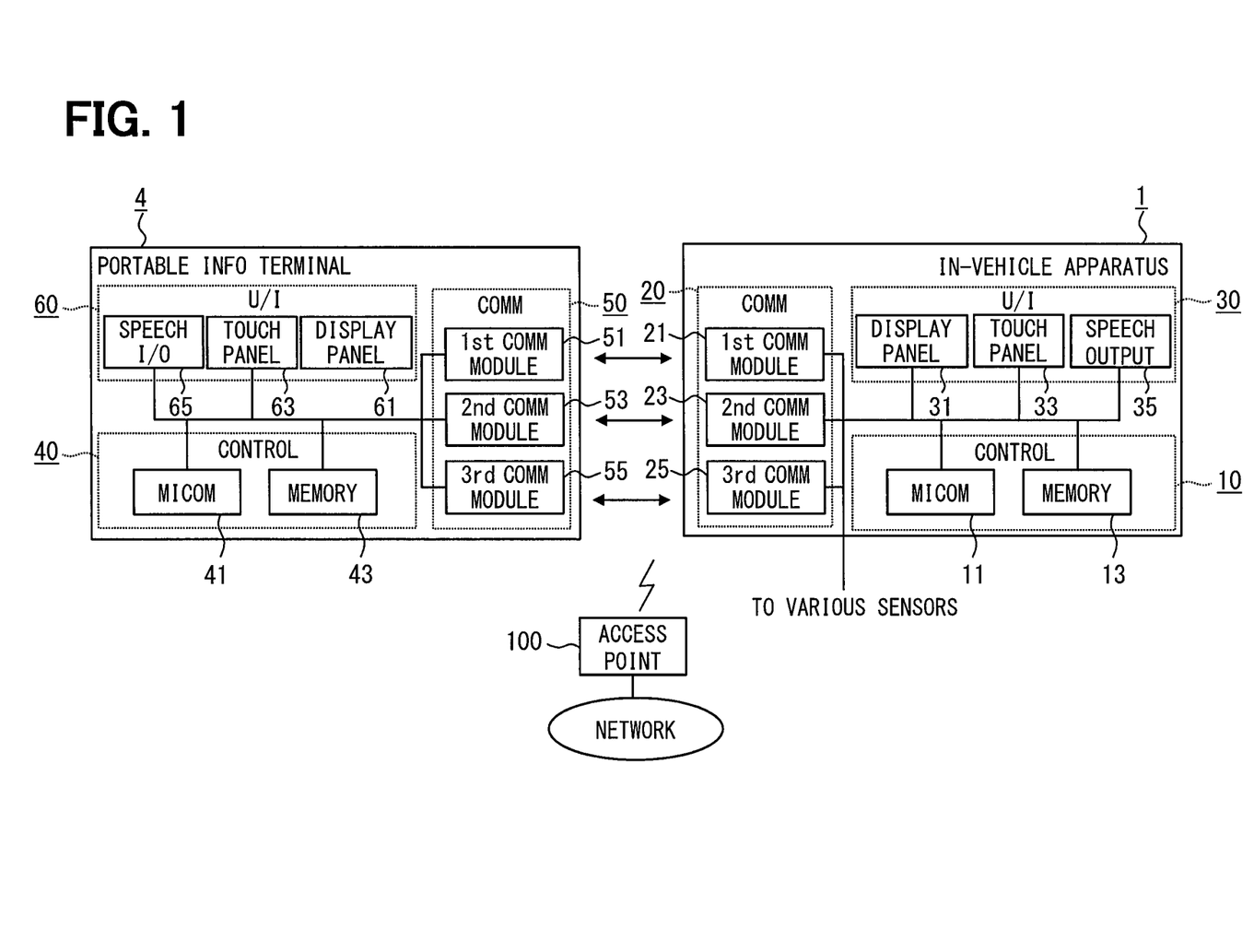
FIG. 1 is a block diagram illustrating an outline configuration of a wireless communication system.

As shown in FIG. 1, a wireless communication system includes an in-vehicle apparatus 1 mounted to a vehicle, and a portable information terminal 4 carried by a user.

The in-vehicle apparatus 1 is an electronic apparatus having a navigation function, a content playback function, a communication function etc., and includes a controller 10, a communication device 20, a user-interface part (U/I) 30 etc., which are communicably connected via a bus line.

The controller 10 includes a microcomputer 11 equipped with CPU, ROM, RAM etc., and a memory 13 for storing various data etc.

The communication device 20 includes a first communication module 21 for controlling wireless communications according to a predetermined standard, a second communication module 23 for controlling wireless communications according to another standard, a third communication module 25 for controlling wired communications according to a predetermined standard, and the like.

The first and second communication modules 21, 23 are configured so that a communication area spreads over at least a predetermined region centered at a compartment of the vehicle. Specifically, for example, an antenna is arranged in the compartment (instrument panel, front windshield or the like) to form such a communication area because of antenna performance that the communication area centering at the compartment of the vehicle covers a certain area outside the vehicle because of antenna performance, or the antenna is arranged in the compartment (the same as the above) and an antenna for vehicle outside is arranged outside the vehicle (roof, hood, bumper) to form the communication area.

In the present embodiment, the first communication module 21 controls wireless communications according to Wi-Fi (registered trademark) standards, and the second communication module 23 controls wireless communications according to Bluetooth (registered trademark) standards, and the third communication module 25 controls wired communications according to USB (Universal Serial Bus) standards.

The user-interface part 30 includes a display panel 31 for displaying a variety of information, a touch panel 33 arranged on a display region of the display panel 31, a speed output part 35 for controlling an output of the speech from a loudspeaker arranged in the compartment of the vehicle, and the like.

This in-vehicle apparatus 1 is connected to various vehicle sensors (not shown) and is capable of acquiring information on a driver's operation state concerning steering, acceleration, brake and the like, and information on vehicle travel speed.

The portable information terminal 4 is a multifunctional portable terminal (what is called a smart phone) having a navigation function, a content playback function and the like. The portable information terminal 4 includes a controller 40, a communication device 50, a user-interface part (U/I) 60 etc., which are connected through a bus line.

The controller 40 includes a microcomputer 41 equipped with CPU, ROM, RAM etc., and a memory 43 for storing various data.

The communication device 50 includes a first communication module 51 for controlling the wireless communications according to a predetermined standard, a second communication module 53 for controlling wireless communications according to another standard, a third communication module 55 for controlling wired communications according to a predetermined standard, and the like. A setting is made so that the first and second communication modules 51 and 53 have a communication area covering at least the compartment of the vehicle.

In the present embodiment, the first communication module 51 controls the wireless communications according to Wi-Fi (registered trademark) standards. The second communication module 53 controls the wireless communications according to Bluetooth (registered trademark) standards. The third communication module 55 controls the wired communications according to USB standards.

The user-interface part 60 includes a display panel 61 for displaying a variety of information, a touch panel 63 arranged on a display region of the display panel 61, a speech input/output part 65 for controlling a speech output from a speaker and a speed input from a microphone, and the like.

2. Remote Control Function

Next, a remote control function provided by this wireless communication system will be explained.

In this wireless communication system, the in-vehicle apparatus 1 has a remote control function of making VNC (Virtual Network Computing) connection with the portable information terminal 4 of the user riding the vehicle, and remotely controlling the portable information terminal 4.

This remote control function is implemented by performing processing as shown below.

First, the controller 10 of the in-vehicle apparatus 1 performs an image display process in which an image signal representing an image displayed on the display panel 61 of the portable information terminal 4 is inputted via any communication module, and in which the image represented by the inputted image signal is displayed on the display panel 31.

Moreover, the controller 10 performs a speech output process in which a speech signal representing a speech outputted from the speech input/output part 65 of the portable information terminal 4 is inputted via any communication module, and in which the speech represented by the inputted speech signal is also outputted from the speech output part 35.

Furthermore, the controller 10 performs an operation output process in which an operation signal representing the operation inputted to the touch panel 33 is outputted via any communication module to the portable information terminal 4, and in which the portable information terminal 4 is instructed about a process when the operation represented by the outputted operation signal is performed in the portable information terminal 4.

Because of this remote control process (the image display process, the speech output process, and the operation output process), the portable information terminal 4 can be remotely controlled from the in-vehicle apparatus 1 during the VNC connection, and as a result, functions of the portable information terminal 4 are usable from the in-vehicle apparatus 1.

The above-described VNC connection is started on a condition that the communication is established between the in-vehicle apparatus 1 and the portable information terminal 4 registered as a target (candidate of VNC connection) of the remote control process. Specifically, the user needs to register beforehand the portable information terminal 4, which is for the remote control, into the in-vehicle apparatus 1.

This registration is carried out by making a pairing setting for communication. After the registration, the communication between the in-vehicle apparatus 1 and the portable information terminal 4 is automatically established only by carrying the portable information terminal 4 in a communicable state (e.g., having ON of power and wireless communication settings, or having a cable connection) into the vehicle.

Upon establishment of the communication between the in-vehicle apparatus 1 and the registered portable information terminal 4, these two apparatus start the VNC connection.

It is noted that when multiple registered portable information terminals 4 are present, the first communication is established via the first communication module 21 (Wi-Fi) with the terminal of these terminals that first becomes communicable or that is pre-assigned the highest priority, and the VNC connection is started over the established communication link.

3. Communication Switchover Process in In-Vehicle Apparatus 1

Now, based on FIG. 2, explanation will be given on a procedure of the communication switchover process performed by (the microcomputer 11 of) the controller 10 of the in-vehicle apparatus 1. This communication switchover process is repeatedly performed after the startup of the in-vehicle apparatus 1.

It is noted that when multiple portable information terminals 4 wirelessly communicable via the first communication module 21 are present in the communication area, the communication switchover process may be stopped from the following viewpoint The terminal the for the VNC connection and the terminal for communicating with a communication device (specifically, access point 100 of wireless LAN) newly entering into the communication area differently used, so that the terminal not performing the VNC connection is used to communicate with the wireless LAN point.

When this communication switchover process is started, a search of communication devices existing nearby is made first (S110). This search is repeated until a communication device is newly detected (No at S120 to S110). In the present embodiment, at S110, it is checked in accordance with communication standards of the wireless LAN whether or not a new communicable communication device (specifically, the access point 100 of the wireless LAN) enters into the communication area of the first communication module 21.

At S120, only when a predetermined communication device (a communication device having a registered identification information (SSID; service set identifier)), which is registered in the in-vehicle apparatus 1, is detected, it may be determined that the new communication device is detected.

Then, when the new communication device is detected (YES at S120), it is checked (S130) whether or not the wireless connection with a different communication device such as a portable information terminal 4 and the like has been established via the first communication modules 21 at this time.

When it is determined at S130 that the wireless connection has not been established (NO at S130), the wireless connection with the new communication device detected at the above S110 is established (S140) and thereafter the process returns to S110. At S140, the wireless connection with this communication device is established through exchanging prescribed things for establishment of the wireless connection with a communication device.

When it is determined at S130 that the wireless connection has been established (YES at S130), it is checked (S150) whether or not the above-described remote control process is continuously performed with the communication device (portable information terminal 4) having this wireless connection. In this example, when a data for the remote control process (image signal, speech signal, operation signal etc.) is exchanged via the first communication module 21, it is determined that the remote control process is continuously performed. That is, even when the wireless communication connection is established via the first communication module 21 (Wi-Fi), it is determined that the remote control process is not continuously performed when the data for the remote control process is not exchanged.

When it is determined that the remote control process is not continuously performed (NO at S150), the process proceeds to S140 to establish the wireless connection with the new communication device detected at the above S110.

At S140 in this case, the wireless connection with the communication device (portable information terminal 4) previously established via the first communication module 21 is released, and then, the wireless connection with the new communication device is established.

When it is determined at S150 that the remote control process is continuously performed (S150: YES), it is checked at this time whether or not the vehicle mounted with the in-vehicle apparatus 1 is traveling (S170).

In the present embodiment, it is determined whether or not the vehicle is traveling, based on a detection result of a vehicle speed sensor of the vehicle or a detection result of a sensor detecting the operation state. Specifically, when the determination is made based on a detection result of the vehicle speed sensor of the vehicle, the detection result of the vehicle speed sensor of the vehicle is acquired. When the vehicle speed indicated by this detection result is greater than or equal to a vehicle speed supposed to be reached in the traveling, it is determined that the vehicle is traveling. When the determination is made based a detection result of the sensor detecting the operation state, the detection result of the sensor detecting the driver's operation state of the steering, the accelerator, the brake or the like. When this operation state is the operation supposed to be in the traveling, it is determined that the vehicle is traveling.

When it is determined that the vehicle is not traveling (NO at S170), a notification starts be issued (S180) indicating that a new communication device such as the network-connected access point 100 is present in the communication area and a different service is enjoyable via the communication with this communication device.

In the above, it is further checked whether or not the communication modules other than the first communication module 21 are communicable with the previously-connected the wireless communication device, i.e., whether or not a different communication path is present, and this determination result is also notified.

For example, when it is determined that "a different communication path is present", the notification is issued by providing a message (see FIG. 3) inquiring about whether the wireless connection with the new communication device is to be established via the first communication module 21, about how to handle the previously-established wireless connection with the communication device (the communication is re-established via another communication module or the communication is released). When it is determined that "there is no different communication path", the notification is issued by providing a message inquiring about whether the wireless connection with the new communication device is to be established via the first communication module 21.

In the above, the notification is issued in such a way that a speech message or an image/text message is outputted from the speech output part 35 (speaker), the display panel 31 or the portable information terminal 4.

Figure 3:
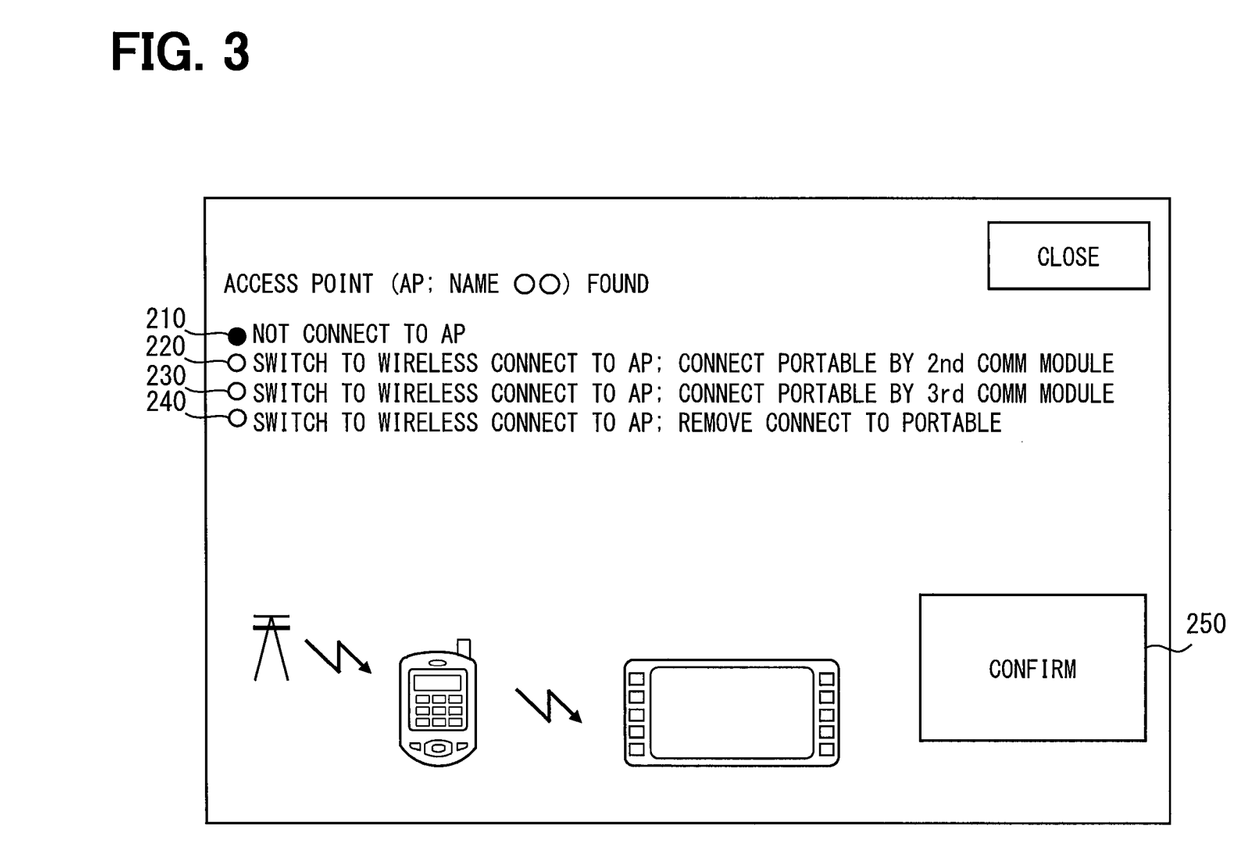
FIG. 3 is a diagram illustrating a message outputted from a display panel.

The user can instruct the in-vehicle apparatus 1 about establishment of the wireless connection by operating the touch panel 33 through an operation for instructing the establishment of the wireless connection with the new communication device (establishment operation; an operation of tapping the selection button 220 to 240 and the confirmation button 250), through a predetermined operation for releasing the wireless connection with the previously-connected communication device (release operation), or through an operation for instructing the maintenance of the present status without the establishment of the wireless connection with the new communication device (maintain operation; an operation of tapping the selection button 210 and the confirmation button 250).

It is noted that acceptance of an operation after the above notification at S180 may be started regardless of a result of the above determination at S170.

After the notification is started at S180 in the above way, or when it is determined at S170 that the vehicle is not traveling (YES at S170), it is checked (S190) whether or not the above-described establishment operation or release operation has been performed within a predetermined time period since the determination was made at S170.

When it is determined at S190 that the above-described establishment operation or release operation has been performed (S190: YES), the process proceeds to S140 after the notification, which was started at S180, is ended (S200). At S140, the wireless connection with the new communication device detected at S110 is established. It is noted that when the message is outputted at S180, this output is ended at S200, so that the notification is ended.

At S140 in this case, the wireless connection to the new communication device is established in accordance with contents of the user's operation (the selection button 220 to 240 in the selected state at a time when the confirmation button 250 is tapped), which is performed after the notification at S180.

For example, when the operation representing that the previously-established communication with the portable information terminal 4 should be re-connected by the second communication module 23 or the third communication module 25 and that the wireless connection with the new communication device is established (the selection button 220, 230), the previously-established wireless connection with the portable information terminal 4 is released and reconnected to the corresponding communication module. Thereafter, the wireless connection with the new communication device is established by the first communication module.

When the operation representing that the previously-established connection with the portable information terminal 4 should be released and that the wireless connection with the new communication device should be established (the selection button 240), the previously-established wireless connection with the portable information terminal 4 is released and the wireless connection with the new communication device is established by the first communication module.

When it is determined at S190 that neither the establishment operation nor the release operation is performed (NO at S190), a search of a communication device existing nearby is made (S210) in a manner similar to that at S110. Based on a result of the search, it is checked (S220) whether or not the communication device detected at S120 is out of the communication area. In the above, when the communication device detected at S210 is the same as the communication device detected at the most-recently executed S120, it is determined that the communication device is not out of the communication area.

When it is determined at S220 that the communication device is not out of the communication area (NO at S220, the process returns to S150 and subsequent steps are repeated.

When it is determined at S220 that the communication device is out of the communication area (YES at S220), the process returns to S110 after the notification, which was started at S180, is ended (S230), as is the case in S200.

In this regard, however, when the user's operation performed after the notification at S180 is the maintain operation (the selection button 210 is in the selected state at a time when the confirmation button 250 is tapped), the notification at S180 is not performed during the repeated subsequent steps.

4. Technical Effect

Figure 2:
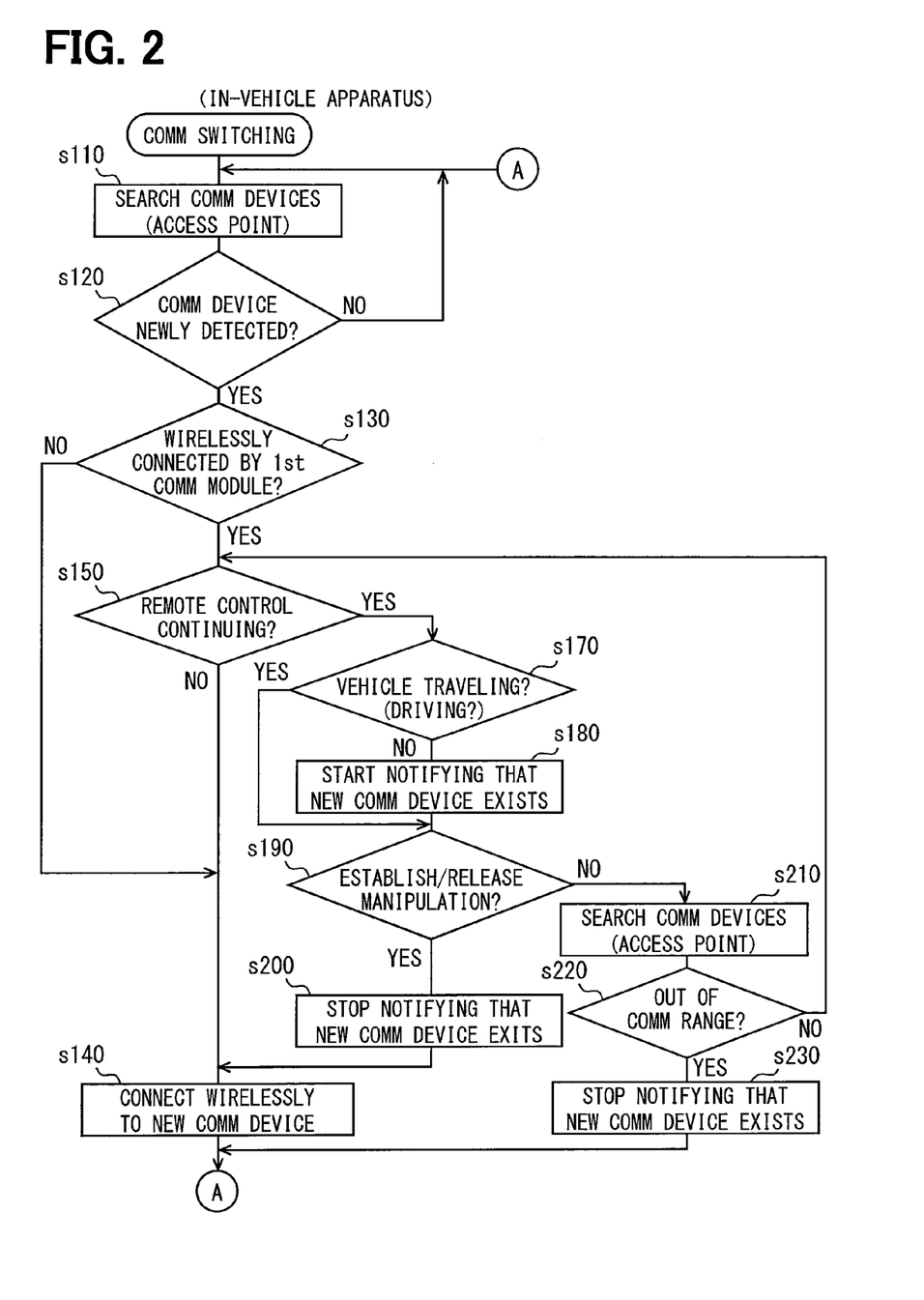
FIG. 2 is a flowchart illustrating a communication switchover process.

In the in-vehicle apparatus 1 of the embodiment, even when the wireless connection with a certain communication device (first communication device; portable information terminal 4) is established (FIG. 2, YES at S130), the in-vehicle apparatus 1 of the above-mentioned embodiment can preferentially establish (FIG. 2, S140) the wireless connection with a different communication device newly entering into the communication area (first communication device; the access point 100) when the communication of the predetermined content is not performed with the first communication device (FIG. 2, NO at S150).

Specifically, when the communication with the first communication device is performed for the predetermined content (FIG. 2, YES at S150), the wireless connection with the second communication device is not immediately established (FIG. 2, S170 to S230). Here, in the above-mentioned embodiment, the communication with the first communication device in the remote control process is defined as "the communication of the predetermined content". Thus, on a condition that fulfillment of the remote control function based on this remote control process is not prevented, a different service is enjoyable through the communication with the second communication device.

The "establishing the wireless connection preferentially" described herein refers to establishing the wireless connection by giving priority to the wireless connection with the second communication device. In the present embodiment where the communication function of the communication module is exclusively occupied by the communication with a particular communication device, the previously-established wireless connection with the first communication device is released, and then, the wireless connection with the second communication device is established.

In particular, in the present embodiment, when a different communication path for enabling the communication with the first communication device is present, the user's choice (FIG. 2, S140) can be made for the following; the previously-established wireless connection with the first communication device is released and the first communication device is communicably reconnected via the different communication path, and then, the wireless connection with the second communication device is established.

Moreover, because the above-mentioned embodiment can notify the user that the second communication device is wirelessly connectable (FIG. 2, S180), even when the communication of the predetermined content with the first communication is in execution at the present time, the user can recognize this and intentionally preferentially established the wireless connection with the second communication device (FIG. 2, S180 to S140).

Moreover, in the above-mentioned embodiment, when the vehicle is traveling, the notification indicating that the second communication device is wirelessly connectable is not notified (FIG. 2, YES at S170). Therefore, it is possible to prevent this notification from interrupting the driver's driving.

5. Modification

Although one embodiment of the present disclosure has been described above, embodiments of the present disclosure are not limited to the above-described embodiment and can have various forms within technical scope of the present disclosure.

For example, the above-mentioned embodiment illustrates a configuration in which when the vehicle equipped with the in-vehicle apparatus 1 is traveling, the notification is not issued (FIG. 2, YES at S170). However, this example does not limit the configuration. In some cases, because it may be preferable that the notification be not issued depending on behavior of an apparatus equipped with the communication device that has the same configuration as the in-vehicle apparatus, the notification may not be issued depending on such behavior.

In the above-illustrated configuration of the above embodiment, only when the predetermined second communication device enters into the communication area, subsequent determinations and wireless connection establishment are made. However, this does not limit a condition for making the determinations and wireless connection establishment.

In the above-illustrated configuration of the above-mentioned embodiment, when the condition, which is entry of a different communication into the communication area, is satisfied, subsequent determinations and wireless connection establishment are made (FIG. 2, YES at S120). However, this does not limit a condition for triggering the determinations and wireless connection establishment.

Figure 4:
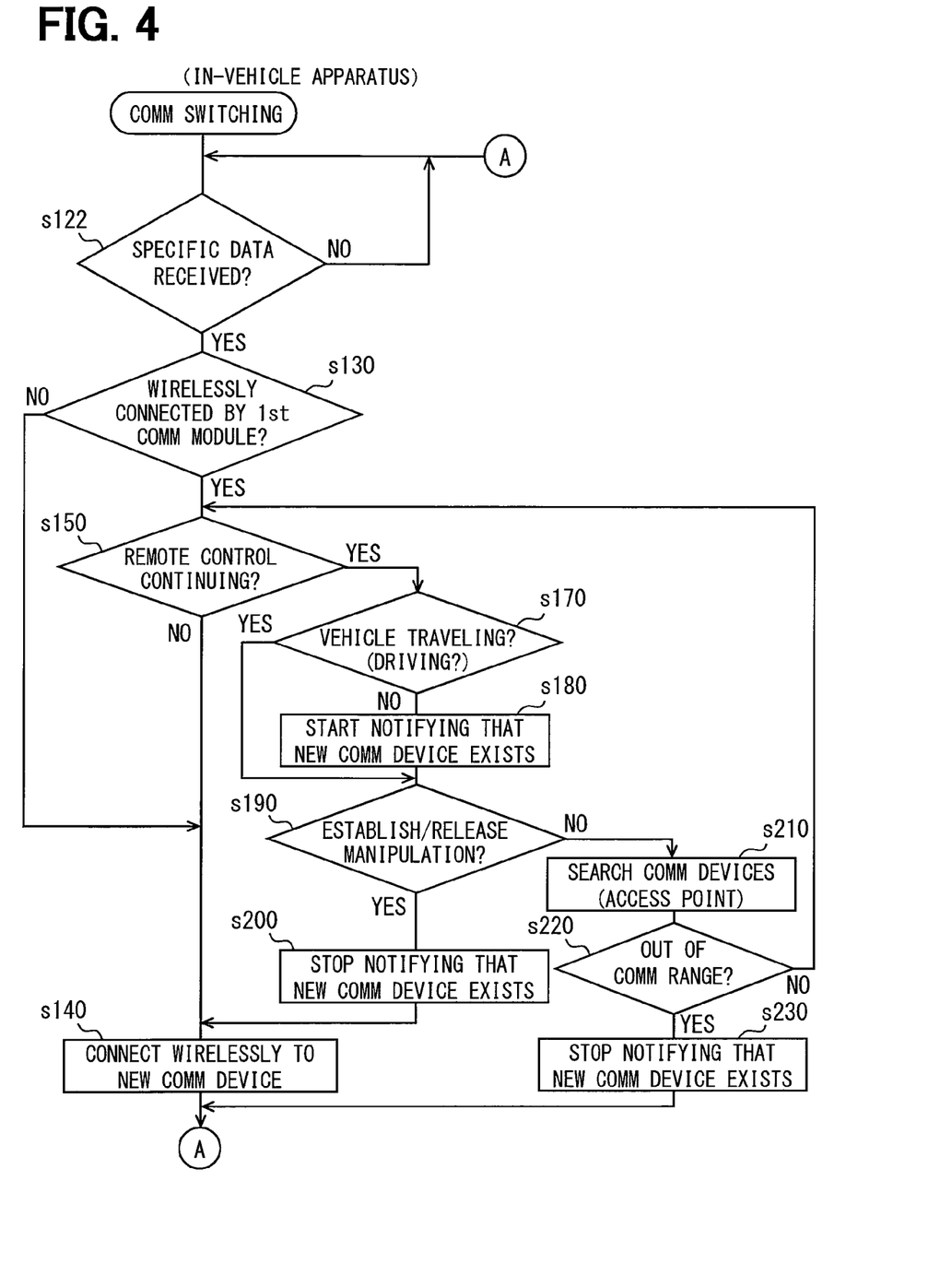
FIG. 4 is a flowchart illustrating a communication switchover process in a first modification.

A specific example is as follows. Reception of a predetermined data from a different communication device entering into the communication area is adopted as a condition for executing S130 and subsequent steps. In this case, as shown in FIG. 4, after the communication switchover process starts up, a waiting state is kept until the reception of the predetermined data (S122: NO). When this data is received, the process proceeds to S130 and subsequent steps.

According to this configuration, only when the predetermined data is received from a different communication device entering the communication area, subsequent determinations and wireless connection establishment can be made (FIG. 4, YES at S122 to S140). Therefore, when a communication device not transmitting this data enters into the communication area, the determinations and wireless connection establishment are not executed. A useless increase in processing load due to these executions is prevented.

Moreover, in the above-mentioned embodiment, the communication switchover process has an example configuration in which when it is determined at S150 that the remote control process is continuously performed (FIG. 2, YES at S150), the process immediately proceeds to subsequent determination processes (S170). However, in another configuration, theses determination processes may be performed only when the remote control process continues for a given time period.

Figure 5:
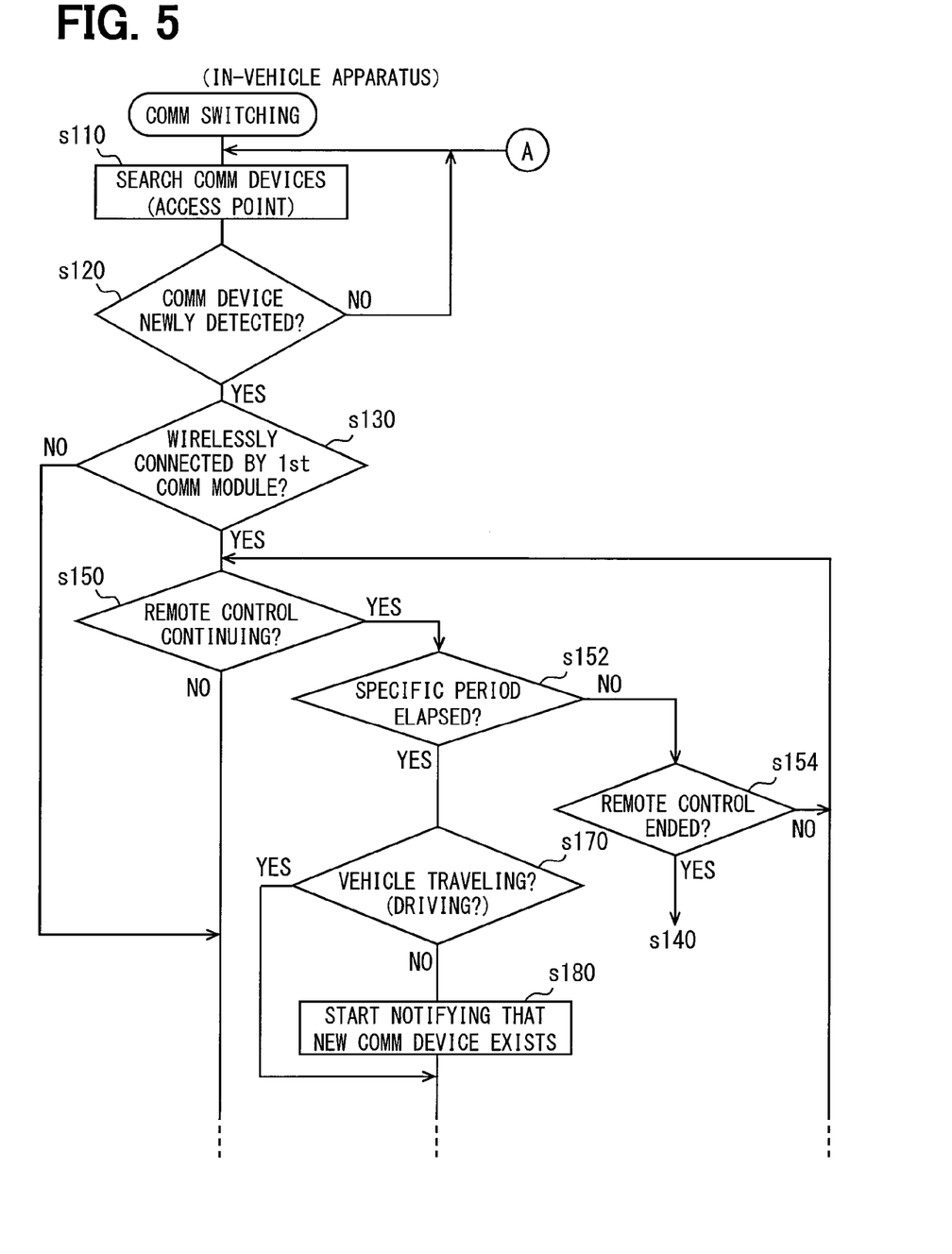
FIG. 5 is a flowchart illustrating a communication switchover process in a second modification.

As a conceivable specific configuration for this, the communication switchover process may have the following configuration. First, as shown in FIG. 5, when it is determined at S150 that the remote control process is continuously performed (YES at S150), it is checked (S152) whether a specific time period has elapsed since the determination "YES" was made at S130.

When the specific time period has elapsed (YES at S152), the process proceeds to S170. When the specific time period has not elapsed (NO at S152), it is determined at this time point whether or not the remote control process is ended (S154)

When the remote control process is not ended (NO at S154), the process returns to S150. When the remote control process is ended (YES at S154), the process proceeds to S140 and the wireless connection to the new communication device is established.

Moreover, in the above-mentioned embodiment, the communication switchover process has an example configuration which assumes that the communication with the different communication devices (second communication device) is established via the first communication module. However, in another configuration, the communication with the second communication device may be established via a different communication module. In the configuration in which the communication is established via the third communication module, an operation of physically releasing a connection state (the operation of pulling out a cable) may be determined as the above-described release operation at S190 of the communication switchover process.

Moreover, the above-mentioned embodiment illustrates an example configuration in which the wireless connection with the new communication device is established when the remote control process is not continuously performed irrespective of the concrete contents of the process. However, in another configuration, only when a particular process of the remote control process is not continuously performed, the wireless connection with the new communication device may be established. Specifically, when the speech output process is not performed continuously, i.e., when a voice call is not performed in the cellular phone terminal 4, an unintentional interruption of at least the voice call is prevented.

In the embodiments described above, an element for implementing the communication function of the in-vehicle apparatus 1 can correspond to a communication section. The controller 10 performing S140 can correspond to an example of a connection establishment means and a connection establishment section. The controller 10 performing S110, S120, S122 can correspond to an example of an entry detection means and an entry detection section. The controller 10 performing S120 can correspond to an example of a device determination means and a device determination section. The controller 10 performing S130, S150 can correspond to an example of a communication determination means and a communication determination section. The controller 10 performing S180 can correspond to an example of a state notification means and a state notification section. The controller 10 performing S190 can correspond to an example of a switchover acceptance means and a switchover acceptance section. The controller 10 performing S170 can correspond to an example of a travel determination means and a travel determination section.

According to the present disclosure, a subject communication device can be provided in various forms.

For example, a subject communication device according to a first aspect is communicable with different communication devices and comprises: a connection establishment section establishing a wireless connection with the different communication devices; an entry detection section detecting that the different communication devices enter into a communication area; and a communication determination section determining whether the wireless connection with a first communication device, which is one of the different communication devices, has not been established at a time when the entry detection section detects that a second communication device, which is another one of the different communication devices, enters into the communication area, or whether or not a communication of a predetermined content is being performed with the first communication device having the established wireless communication at the time when the entry detection section detects that the second communication device enters into the communication area.

The connection establishment section is configured to preferentially establish the wireless connection with the detected second communication device when the communication determination section determines that, at the time when the entry detection section detects that the second communication device enters into the communication area, the wireless connection with the first communication device has not been established or the communication of the predetermined content is not being performed with the first communication device.

According the subject communication device configured in the above way, even when the wireless connection with a certain communication device (first communication device) is established, the wireless connection with a different communication device (second communication device) newly entering into the communication is preferentially established when the communication of the predetermined contents is not being performed with this first communication device.

Specifically, when the communication of the predetermined content is being performed with the first communication device, the wireless connection with the second communication device is not immediately established. Thus, for example, when a communication concerning a control/operation in the first communication device is defined as "the communication of the predetermined content", a different service becomes enjoyable through establishment of the wireless connection with the second communication device under a condition that the control/operation in the first communication device is not hindered.

The "preferentially establishing the wireless connection" in this configuration refers to establishing the wireless connection by giving priority to establishing the wireless connection with second communication device.

When a communication function of the subject communication device is designed to be exclusively occupied by a particular communication device, the wireless connection with the earlier-connected first communication device is released and then the wireless connection with the second communication device is established.

In this regard, however, when there is a different communication path enabling communication with the first communication device, the wireless connection with the earlier-connected first communication device is released and the first communication device is communicably connected via the different communication path and then the wireless connection with the second communication device is established.

In the above configuration, there may be a demand that a user would like to recognize a presence of the second communication device and determine whether or not to preferentially connect with the second communication device wirelessly. Therefore, even when the communication of a predetermined content is being performed with the first communication device, intentional establishment of preferential wireless communication with the second communication device may be provided.

In view of this, the above subject communication device (second aspect) may further comprises a state notification section and a switchover operation acceptance section. The state notification section notifies a user of the subject communication device that the second communication device is wirelessly connectable when the communication determination section determines that the communication of the predetermined content is being performed with the first communication device at the time when the entry detection section detects that the second communication device enters into the communication area. The switchover operation acceptance section accepts an operation for switching over the wireless connection to the different communication device after the entry detection section detects that the second communication device enters into the communication area, When the switchover operation acceptance section accepts the operation, the connection establishment section preferentially establishes the wireless connection with the detected second communication device even when the communication determination section determines that the communication of the predetermined content is being performed with the first communication device at the time when the entry detection section detects that the second communication device enters into the communication area.

According to this configuration, it is possible to notify the user that the second communication device is wirelessly connectable. Therefore, even when the communication of a predetermined content is being performed with the first communication device at this time, the user can recognize it and intentionally establish a preferential wireless connection with the second communication device.

In this configuration, in some situations, it may be preferable not to issue the notification depending on behavior of an apparatus equipped with the subject communication device. A concrete example is that the subject communication device is mounted to a vehicle. In this case, when the vehicle is traveling, it may be preferable from a safety viewpoint not to issue the notification that prompts an operation of a user, who is a driver.

In order not to issue the notification in these cases, the above subject communication device (third aspect) further comprises a travel determination section determining whether or not a vehicle is traveling based on behavior of the vehicle or an operation content when the subject communication device is mounted to the vehicle. When the travel determination section determines that the vehicle is traveling, the state notification section is prohibited from notifying the user of the subject communication device.

In this configuration, when the vehicle is traveling, the notification indicating that the second communication device is wirelessly connectable is not issued. Therefore, the hindering of the user's driving of the vehicle by this notification is prevented.

In this configuration, from detection of the vehicle speed greater than or equal to a certain value, it may be directly determined that "the vehicle is traveling". From execution of an operation relating to the traveling of the vehicle such as steering, accelerator, brake or the like, it may be indirectly determined that "the vehicle is traveling".

In each of the above-mentioned configurations, when the different communication device enters into the communication area, a connection with this communication device may be established by a particular connection section. In this case, another communication device with which the connection was previously connected may be reconnected by another communication section.

To do so, the subject communication device may further comprise a first communication section, a second communication section, and a second connection establishment section. The first communication section and the second communication section are communicable with the different communication devices when the subject communication device is mounted to a vehicle. When the second connection establishment section establishes, by using the first communication section, the wireless connection with a different communication device outside the vehicle detected as the second communication device, the second connection establishment section establishes, by using the second communication section, a communication connection with a different communication device inside the vehicle that has the established wireless connection as the first communication device at the when the different communication device outside the vehicle is detected.

In this configuration, when the different communication device enters into the communication area, it is possible to establish the connection with the different communication device newly entering into the communication area while maintaining the earlier-established connection with another different communication device.

The above subject communication device may be configured as follows (fifth aspect). When a plurality of the different communication devices connectable with the first communication section are present inside the vehicle, the first communication section is used to continue performing the communication connection with the different communication device inside the vehicle that has the established the wireless connection at the time when the different communication device outside the vehicle is detected.

In this configuration, when the different communication devices are already present in the communication area and any one of these different communication devices is possible to establish the connection with the newly entering different communication device, the connection with the newly entering different communication device is not established.

In the above four and fifth aspects, the subject communication device is installed in a vehicle so that the communication area centered at the compartment spreads. However, the communication area may be provided around other installation place than the vehicle.

In the above configuration, after detection of the entry of second communication devices into the communication area, it may be determined for all the second communication devices whether or not each second communication device communication of the predetermined content, with the first communication device and the preferential establishment of the wireless connection may be made based on this determination. However, this determination and establishment of the wireless connection may be made only when a second communication device meeting a certain condition enters into the communication area.

The "certain condition" in the above case may be any conditions. For example, the "certain condition" may be a communication device registered beforehand. An example of configuration adopting this condition is the below subject communication device (sixth aspect).

The subject communication device according to the sixth aspect further comprises a device determination section determining whether or not the second communication device is a predetermined communication device when the entry detection section detects entry of the second communication device. A determination by the communication determination section and a preferential establishment of the wireless connection with the second communication device by the connection establishment section are made on a condition that the second communication device is the predetermined communication device.

In this configuration, only when a pre-registered communication device enters into the communication area, the determination and the establishment of the wireless connection can be made. Therefore, the determination and the establishment of the wireless connection in response to entry of an unintentional communication device into the communication area are prevented, and a needless increase in processing load is prevented.

The above described "certain condition" may be transmission of a predetermined data from a different communication device entering into the communication area. An example of configuration adopting this condition is the below subject communication device (seventh aspect).

In the subject communication device according to the seventh aspect, the entry detection section detects whether or not a predetermined data is received from the second communication device entering the communication area of the subject communication device. A determination by the communication determination section and a preferential establishment of the wireless connection with the second communication device by the connection establishment section are made on a condition that the entry detection section detects that the predetermined data is received.

In this configuration, only when the predetermined data is received from the different communication device entering the communication area, the determination and the establishment of the wireless connection can be made. Therefore, the determination and the establishment of the wireless connection in response to entry of an unintentional communication device into the communication area are prevented, and a needless increase in processing load is prevented.

An embodiment of the present disclosure may be a program that causes a computer to function as the above subject communication device of any one of the first to seventh aspects. The computer provided with this program can constitute part of the above subject communication device.

A computer system executing this program can provide the same operations and technical effects as any of the above configuration.

The above mentioned program includes a series of instructions adapted for processing of a computer system and is provided to a communication device or its user via various storage medium (e.g., non-transitory tangle storage medium) or a communication line.

An embodiment of the present disclosure may be a communication establishment method described below.

The communication establishment method is for a subject communication device to communicate with different communication devices. The communication establishment method comprises: in a connection establishment process, establishing a wireless connection with the different communication devices; in a device detection process, detecting that the different communication devices enter into a communication area; and in a communication determination process, determining whether or not the wireless connection with a first communication device, which is one of the different communication devices, has not been established at a time when it is detected in the device detection process that a second communication device, which is another one of the different communication devices, enters into the communication area, or whether or not a communication of a predetermined content is being performed with the first communication device establishing the established wireless communication at the time when it is detected in the device detection process that the second communication device enters into the communication area.

The wireless connection with the detected second communication device is preferentially established in the connection establishment process when it is determined in the communication determination process that the wireless connection with the first communication device has not been established or the communication of the predetermined content is not being performed with the first communication device at the time when it is detected in the device detection process that the second communication device enters into the communication area.

This communication establishment method can provide the same operations and technical effects as the subject communication device having any of the above described configurations.

Although embodiments, configuration and aspects of the present disclosure have been illustrated above, embodiments, configuration and aspects of the present disclosure are not limited to the above-illustrated embodiments, configuration and aspects. For example, embodiments, configuration and aspects of the present disclosure include embodiments, configuration and aspects that are obtained by appropriately combining technical parts disclosed in different embodiments, configuration and aspects.

What is claimed is:

1. A subject communication device communicable with different communication devices, comprising:
   a connection establishment section establishing a wireless connection with the different communication devices;
   an entry detection section detecting that the different communication devices enter into a communication area; and
   a communication determination section determining whether the wireless connection with a first communication device, which is one of the different communication devices, has not been established at a time when the entry detection section detects that a second communication device, which is another one of the different communication devices, enters into the communication area, or whether a communication of a predetermined content is being performed with the first communication device having the established wireless communication at the time when the entry detection section detects that the second communication device enters into the communication area,
   wherein:
   the connection establishment section preferentially establishes the wireless connection with the detected second communication device when the communication determination section determines that, at the time when the entry detection section detects that the second communication device enters into the communication area, the wireless connection with the first communication device has not been established or the communication of the predetermined content is not being performed with the first communication device;
   when the entry detection section detects that the second communication device enters into the communication area, the communication determination section determines whether the communication of the predetermined content between the subject communication device and the first communication device is being performed at the time when the entry detection section detects that the second communication device enters into the communication area;
   when the communication determination section determines that the communication of the predetermined content between the subject communication device and the first communication device is not being performed at the time when the entry detection section detects that the second communication device enters into the communication area, the connection establishment section preferentially establishes the wireless connection with the second communication device; and when the communication determination section determines that the communication of the predetermined content between the subject communication device and the first communication device is being performed at the time when the entry detection section detects that the second communication device enters into the communication area, the connection establishment section gives priority to the communication between the subject communication device and the first communication device over establishing the wireless connection with the second communication device.

2. The subject communication device according to claim 1, further comprising:
a state notification section notifying a user of the subject communication device that the second communication device is wirelessly connectable when the communication determination section determines that the communication of the predetermined content is being performed with the first communication device at the time when the entry detection section detects that the second communication device enters into the communication area; and
a switchover operation acceptance section accepting an operation for switching over the wireless connection to the different communication device after the entry detection section detects that the second communication device enters into the communication area,
wherein:
when the switchover operation acceptance section accepts the operation, the connection establishment section preferentially establishes the wireless connection with the detected second communication device even when the communication determination section determines that the communication of the predetermined content is being performed with the first communication device at the time when the entry detection section detects that the second communication device enters into the communication area.

3. The subject communication device according to claim 2, further comprising:
a travel determination section determining whether or not a vehicle is traveling based on behavior of the vehicle or an operation content when the subject communication device is mounted to the vehicle,
wherein:
when the travel determination section determines that the vehicle is traveling, the state notification section is prohibited from notifying the user of the subject communication device.

4. The subject communication device according to claim 1, further comprising:
a first communication section and a second communication section communicable with the different communication devices when the subject communication device is mounted to a vehicle,
wherein:
when the connection establishment section establishes, by using the first communication section, the wireless connection with a different communication device outside the vehicle detected as the second communication device, the connection establishment section establishes, by using the second communication section, a communication connection with a different communication device inside the vehicle that has the established wireless connection as the first communication device at the when the different communication device outside the vehicle is detected.

5. The subject communication device according to claim 4, wherein:
when a plurality of the different communication devices connectable with the first communication section are present inside the vehicle, the first communication section is used to continue performing the communication connection with the different communication device inside the vehicle that has the established the wireless connection at the time when the different communication device outside the vehicle is detected.

6. The subject communication device according to claim 1, further comprising:
a device determination section determining whether or not the second communication device is a predetermined communication device when the entry detection section detects entry of the second communication device,
wherein:
a determination by the communication determination section and a preferential establishment of the wireless connection with the second communication device by the connection establishment section are made on a condition that the second communication device is the predetermined communication device.

7. The subject communication device according to claim 1, wherein:
the entry detection section detects whether or not a predetermined data is received from the second communication device entering the communication area of the subject communication device; and
a determination by the communication determination section and a preferential establishment of the wireless connection with the second communication device by the connection establishment section are made on a condition that the entry detection section detects that the predetermined data is received.

8. A non-transitory tangible storage medium storing a program for causing a computer to function as the subject communication device recited in claim 1.

9. The subject communication device according to claim 1, wherein:
the subject communication device is an in-vehicle apparatus mounted to a vehicle;
the first communication device is a portable terminal inside the vehicle; and
the second communication device is a wireless LAN access point outside the vehicle.

10. The subject communication device according to claim 1, wherein:
the connection establishment section preferentially establishes the wireless connection with the second communication device using a first wireless communication standard and reconnects with the first communication device using a second wireless communication standard, the first wireless communication standard being different from the second wireless communication standard.

* * * * *